(12) United States Patent
Takagi

(10) Patent No.: US 9,457,984 B2
(45) Date of Patent: Oct. 4, 2016

(54) MANUFACTURING METHOD OF OPTICAL FIBER BUNDLE

(71) Applicant: OLYMPUS CORPORATION, Tokyo (JP)

(72) Inventor: Hiroki Takagi, Shiki (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/008,714

(22) Filed: Jan. 28, 2016

(65) Prior Publication Data

US 2016/0159607 A1    Jun. 9, 2016

Related U.S. Application Data

(63) Continuation of application No. PCT/JP2014/074493, filed on Sep. 17, 2014.

(30) Foreign Application Priority Data

Dec. 26, 2013  (JP) ................. 2013-270394

(51) Int. Cl.
*B65H 54/10* (2006.01)
*B65H 55/04* (2006.01)
*G02B 6/04* (2006.01)

(52) U.S. Cl.
CPC .............. *B65H 54/10* (2013.01); *B65H 55/04* (2013.01); *G02B 6/04* (2013.01); *B65H 2701/32* (2013.01)

(58) Field of Classification Search
CPC ...... B65H 54/02; B65H 54/10; B65H 55/04; B65H 2701/32; G02B 6/04
See application file for complete search history.

(56) References Cited

FOREIGN PATENT DOCUMENTS

| GB | 1305063 | 1/1973 |
|---|---|---|
| JP | S39-27279 B1 | 11/1964 |
| JP | S46-18784 B1 | 5/1971 |
| JP | S46-6284 A | 12/1971 |
| JP | S53-13437 A | 2/1978 |
| JP | H05-008935 A | 1/1993 |
| JP | H08-208115 A | 8/1996 |

OTHER PUBLICATIONS

International Search Report dated Dec. 16, 2014 issued in PCT/JP2014/074493.

*Primary Examiner* — William E Dondero
(74) *Attorney, Agent, or Firm* — Scully, Scott, Murphy & Presser, PC

(57) ABSTRACT

While a winding member is making one rotation, an optical fiber is once skewed relative to the circumferential direction and further shifted by a desired length in the width direction of a circumferential surface. In this state, the winding member winds up the optical fiber. This operation is performed in the same direction every rotation when the winding member rotates (N−1) times. Next, in the N-th rotation of the winding member, a guide member performs the guide to the optical fiber to skew reversely to the direction of shifting in the (N−1) rotations of the winding member.

5 Claims, 6 Drawing Sheets

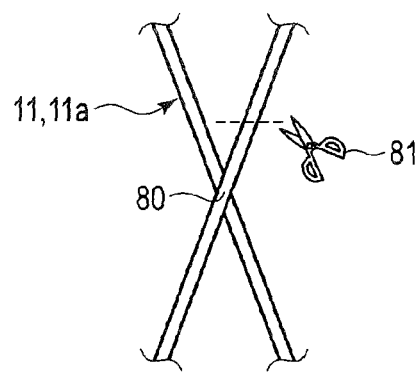
F I G. 2B
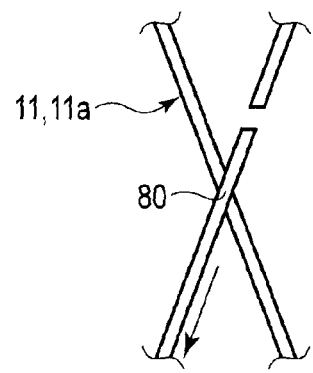
F I G. 2C
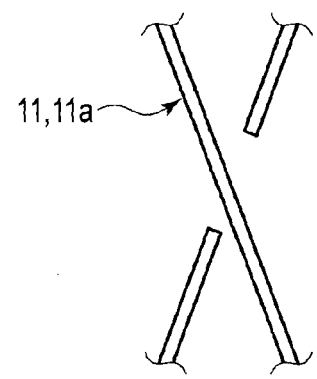
F I G. 2D

US 9,457,984 B2

MANUFACTURING METHOD OF OPTICAL FIBER BUNDLE

CROSS-REFERENCE TO RELATED APPLICATIONS

This application is a Continuation Application of PCT Application No. PCT/JP2014/074493, filed Sep. 17, 2014 and based upon and claiming the benefit of priority from prior Japanese Patent Application No. 2013-270394, filed Dec. 26, 2013, the entire contents of all of which are incorporated herein by reference.

BACKGROUND OF THE INVENTION

1. Field of the Invention

The present invention relates to a manufacturing method of an optical fiber bundle to manufacture an optical fiber bundle formed by bundling optical fibers.

2. Description of the Related Art

A general manufacturing method of an optical fiber bundle is briefly described below.

A base material of an optical fiber is melted by a melt apparatus. The melting member is linearly drawn and wound around a drum-type winding member. The wound member is formed as optical fibers, and the optical fibers are bundled so that an optical fiber bundle is formed.

Major manufacturing methods of optical fiber bundles are disclosed in, for example, Jpn. Pat. Appln. KOKAI Publication No. 5-8935 and Jpn. Pat. Appln. KOKAI Publication No. 8-208115.

BRIEF SUMMARY OF THE INVENTION

An aspect of a manufacturing method of an optical fiber bundle of the present invention in which a winding member rotates N times (N is a natural number equal to or more than 2) to wind up an optical fiber and thereby manufacture an optical fiber bundle having a length that is N times the circumference of the winding member, the method including: a shift process of once skewing the optical fiber relative to the circumferential direction of the winding member and shifting the optical fiber a desired length in the width direction of a circumferential surface of the winding member and then winding the optical fiber around the winding member during one rotation of the winding member and every rotation of the winding member when the winding member rotates (N-1) times with respect to a desired starting point as a standard; and a reverse shift process of skewing the optical fiber reversely to the direction of shifting in the (N-1) rotations of the winding member so that the optical fiber intersects with all the optical fibers which have skewed in the (N-1) rotations of the winding member and the end point of the optical fiber having a length which is N times returns to the starting point in the N-th rotation of the winding member whereby the optical fiber is wound around the winding member, wherein an operation in which the shift process and the reverse shift process are performed once in this order is one cycle of the optical fiber having a length which is N times the circumference of the winding member, and the operation is repeated so that an optical fiber bundle formed by bundling the optical fibers having a length which is N times the circumference of the winding member is manufactured.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2B is a diagram illustrating how the optical fiber bundle is cut with an unshown cutting member;

FIG. 2C is a diagram illustrating how the optical fiber bundle is removed from the winding member;

FIG. 2D is a diagram illustrating how the optical fiber bundle is removed from the winding member;

DETAILED DESCRIPTION OF THE INVENTION

Hereinafter, an embodiment of the present invention will be described in detail with reference to the drawings.

Embodiment

Configuration

The embodiment is described with reference to FIG. 1A, FIG. 1B, FIG. 1C, FIG. 2A, FIG. 2B, FIG. 2C, FIG. 2D, FIG. 3A, FIG. 3B, FIG. 3C, and FIG. 3D. In some of the drawings, some of the members are omitted for clarification of the drawings.

[Manufacturing Apparatus 10 of Optical Fiber Bundle 11a]

Figure 1A:
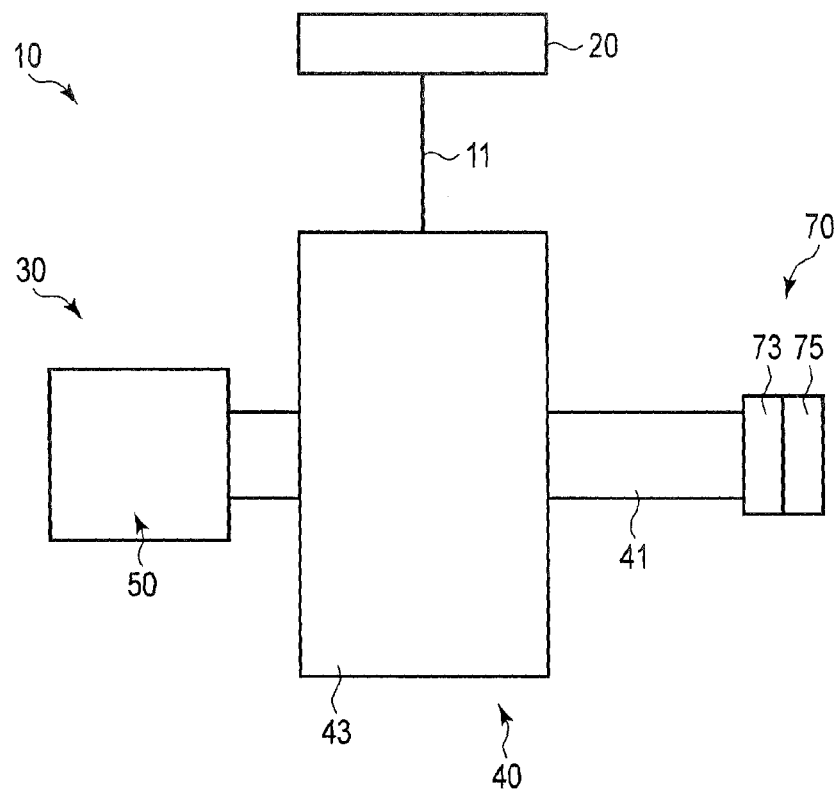
FIG. 1A is a schematic side view of a manufacturing apparatus of an optical fiber bundle according to an embodiment of the present invention.

As shown in FIG. 1A, a manufacturing apparatus 10 has a melt apparatus 20 which melts an unshown base material of an optical fiber 11, and a winding apparatus 30 which winds up the optical fiber 11 when the molten member is linearly drawn and cooled and formed as the optical fiber 11.

Figure 1B:
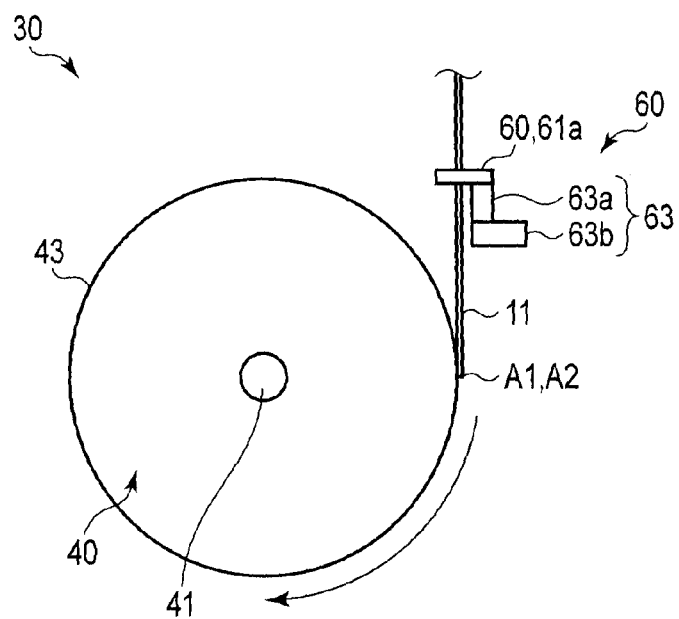
FIG. 1B is a schematic front view of a winding member and a movement guide mechanism.
Figure 1C:
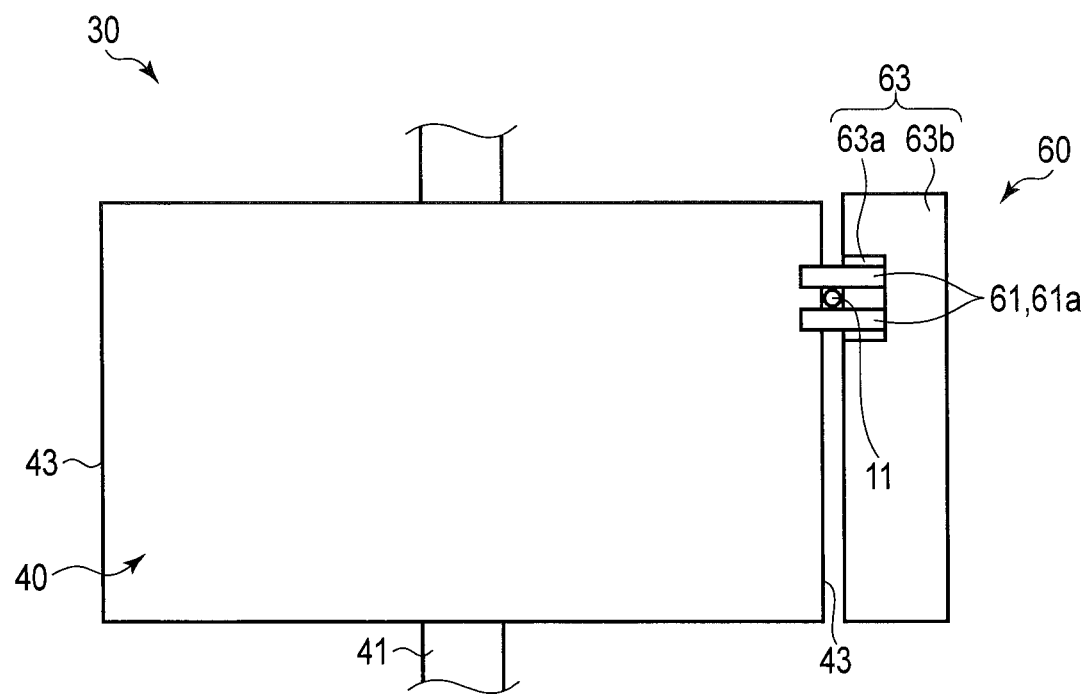
FIG. 1C is a schematic top view of the winding member and the movement guide mechanism.

As shown in FIG. 1A, FIG. 1B, and FIG. 1C, the winding apparatus 30 has, for example, a drum-type winding member 40 which has a central shaft 41 and which rotates around the central shaft 41 to wind up the optical fiber 11, and a rotation control portion 50 which is coupled to the central shaft 41 and which controls the rotation of the winding member 40 so that the winding member 40 rotates around the central shaft 41.

As shown in FIG. 1A, FIG. 1B, and FIG. 1C, the winding apparatus 30 further has a movement guide mechanism 60 which guides the optical fiber 11 to the winding member 40 when the winding member 40 winds up the optical fiber 11, and a detection control unit 70 which detects the rotation angle of the winding member 40 and which controls the movement guide mechanism 60 on the basis of the detection result.

As shown in FIG. 1A, FIG. 1B, and FIG. 1C, according to the present embodiment, the optical fiber 11 is provided along the tangential direction of a later-described circumferential surface 43 of the winding member 40. If the winding member 40 rotates around the central shaft 41 while a distal end portion of the optical fiber 11 is fixed to the winding member 40, the optical fiber 11 is wound around the winding member 40.

The manufacturing apparatus 10 manufactures an optical fiber bundle 11a which is formed by bundling optical fibers 11. The optical fiber bundle 11a including the optical fibers 11 is used for, for example, a light guide. Although not shown, the optical fiber 11 has, for example, a core portion provided in the center of the optical fiber 11, and a cladding portion covering the core portion. This optical fiber 11 is made of a material such as glass that transmits light.

[Winding Member 40]

As shown in FIG. 1A, FIG. 1B, and FIG. 1C, the central shaft 41 is provided to penetrate the winding member 40 in the width direction of the winding member 40. The central shaft 41 is provided in the center of the winding member 40.

As shown in FIG. 1A, FIG. 1B, and FIG. 1C, the winding member 40 has the circumferential surface 43 which is provided around the central shaft 41 to surround the entire circumference of the central shaft 41. The circumferential surface 43 functions as a winding surface to wind up the optical fiber 11, functions as an outer circumferential surface of the winding member 40, and functions as a curved surface portion. As long as the winding member 40 has the circumferential surface 43, the winding member 40 has only to have, for example, a circular columnar shape or a circular cylindrical shape. Around the central shaft 41, the length of the winding member 40, i.e., the length of the circumferential surface 43 is shorter than, for example, the winding length of the optical fiber 11 to be wound around the winding member 40.

The winding member 40 is provided so that the circumferential surface 43 of the winding member 40 is located apart from the ground. Thus, for example, both end portions of the central shaft 41 are supported by an unshown support member so that the circumferential surface 43 of the winding member 40 is located apart from the ground. The support component is, for example, erected on the ground.

[Rotation Control Portion 50]

The rotation control portion 50 shown in FIG. 1A controls the rotation and stopping of the winding member 40 via the central shaft 41. The rotation control portion 50 has a drive portion such as a motor to rotate the central shaft 41 around the central shaft 41.

[Movement Guide Mechanism 60]

As shown FIG. 1B and FIG. 1C, the movement guide mechanism 60 is, for example, provided apart from the circumferential surface 43, is out of contact with the circumferential surface 43, faces the circumferential surface 43 of the winding member 40, and is provided along the tangential direction. The movement guide mechanism 60 is provided, for example, on a higher side of the winding member 40 than the central shaft 41 in the height direction of the winding member 40. The movement guide mechanism 60 is provided beside a top portion of the winding member 40 so that a space portion is formed between the movement guide mechanism 60 and the top portion of the winding member 40 in the diametrical direction of the winding member 40 that intersects at right angles with the tangential direction of the circumferential surface 43 and the width direction of the circumferential surface 43.

As shown FIG. 1B and FIG. 1C, the movement guide mechanism 60 has a guide member 61 which guides the optical fiber 11 to the winding member 40 so that the optical fiber 11 is wound around the winding member 40, and a holding-movable portion 63 which holds the guide member 61 and which is movable together the guide member 61 in the width direction of the circumferential surface 43 of the winding member 40, i.e., a direction that intersects at right angles with the tangential direction.

[Guide Member 61]

As shown FIG. 1B and FIG. 1C, the guide member 61 has, for example, two plate-shaped members 61a which function as a guide jig. As shown FIG. 1C, the plate-shaped members 61a are provided in parallel for the optical fiber 11 provided along the tangential direction, sandwich the optical fiber 11 from both sides in the width direction of the circumferential surface 43. The guide member 61 is made of a low-friction material having a low frictional coefficient.

Although described in detail later, the guide member 61 guides the optical fiber 11 in sandwiching state from a point A1 and a point A2 which are starting points of winding to the point A1 and the point A2 which are also end points of winding when the optical fiber 11 having a length which is N times the circumferential length of the winding member 40 is manufactured. N is a natural number equal to or more than 2.

In this instance, the guide member 61 guides the optical fiber 11 so that the optical fiber 11 once skews in the circumferential direction during one rotation of the winding member 40, and the guide member 61 performs this skew guide in the same direction every rotation when the winding member 40 rotates (N−1) times.

In the N-th rotation of the winding member 40, the guide member 61 performs the guide to the optical fiber 11 to skew reversely to the direction of shifting in the (N−1) rotations of the winding member 40 so that the optical fiber 11 intersects with all the optical fibers 11 which have skewed in the (N−1) rotations of the winding member 40 and returns to the starting point. The guide member 61 guides so that an intersection angle θ may be, for example, 5 degrees or more and 40 degrees or less.

This above-mentioned guiding is achieved if the holding-movable portion 63 which holds the guide member 61 moves in the width direction of the circumferential surface 43.

[Holding-Movable Portion 63]

As shown FIG. 1B and FIG. 1C, the holding-movable portion 63 has a holding member 63a which holds the guide member 61, and a moving member 63b to which the holding member 63a is fixed and which moves the guide member 61 via the holding member 63a in the width direction of the circumferential surface 43 by moving the guide member 61 in the width direction of the circumferential surface 43 on the basis of the detection result of the detection control unit 70, i.e., in accordance with the rotation angle of the winding member 40.

[Detection Control Unit 70]

As shown in FIG. 1A, the detection control unit 70 has a detection portion 73 which functions as, for example, an encoder, and a movement control portion 75.

[Detection Portion 73]

The detection portion 73 detects the rotation angle of the winding member 40.

[Movement Control Portion 75]

The movement control portion 75 controls the holding-movable portion 63 so that the holding-movable portion 63 moves in the width direction of the circumferential surface 43 or the holding-movable portion 63 stops on the basis of the detection result of the detection portion 73, i.e., the rotation angle of the winding member 40.

[Manufacturing Method]

A manufacturing method of the optical fiber bundle 11a having a length which is N times the circumferential length of the winding member 40 in the winding apparatus 30 is described below with reference to FIG. 1A, FIG. 1B, FIG. 1C, FIG. 2A, FIG. 2B, FIG. 2C, FIG. 2D, FIG. 3A, FIG. 3B, FIG. 3C, and FIG. 3D. N is a natural number equal to or more than 2.

In the following, by way of example, the manufacture of the optical fiber bundle 11a having a length which is double the circumferential length of the winding member 40 is described with reference to FIG. 2A, FIG. 2B, FIG. 2C, and FIG. 2D, and the manufacture of the optical fiber bundle 11a having a length which is triple the circumferential length of the winding member 40 is described with reference to FIG. 3A, FIG. 3B, FIG. 3C, and FIG. 3D.

[Manufacture of the Optical Fiber 11 Having a Length which is Double the Circumferential Length of the Winding Member 40]

(Step 1 (Preparation Process), Point A1 (Starting Point))

The unshown base material of the optical fiber 11 is melted by the melt apparatus 20. As shown in FIG. 1A and FIG. 1B, the melting member is linearly drawn, for example, along the tangential direction of the circumferential surface 43, naturally cooled, and formed as the optical fiber 11. The distal end portion of the optical fiber 11 is guided to the circumferential surface 43 of the winding member 40 while being sandwiched between the plate-shaped members 61a, and positioned at and fixed to the circumferential surface 43. This positioning and fixing part is hereinafter referred to as the point A1 which functions as the starting point, i.e., an initial position.

The winding member 40 then rotates around the central shaft 41 to pull and wind up the optical fiber 11. In the following, the rotation direction of the winding member 40 is the same.

(Step 2 (Shift Process), Point A1→Point B1)

Figure 2A:
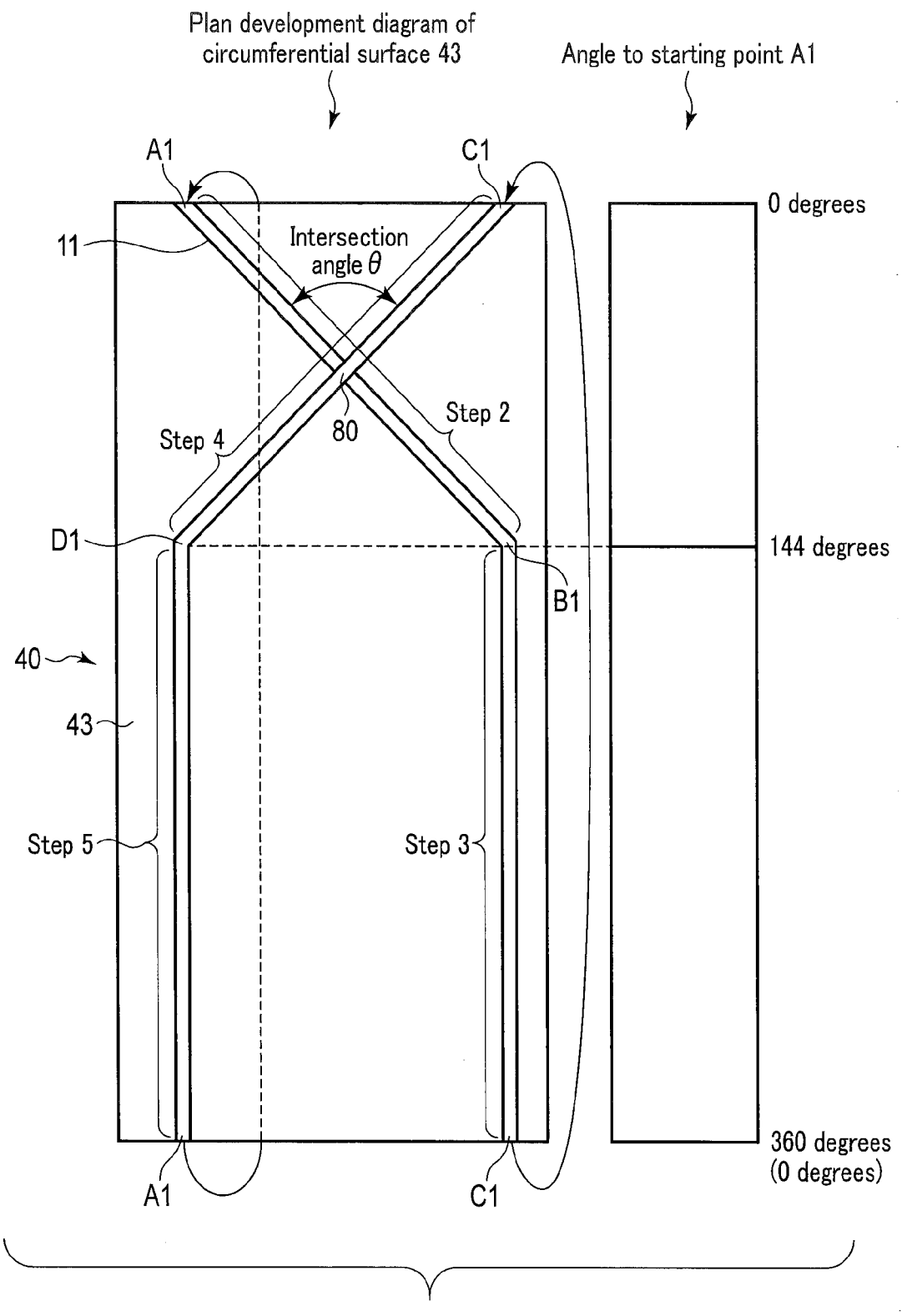
FIG. 2A is a diagram illustrating the manufacture of an optical fiber bundle having a length which is double the circumferential length of the winding member.

As shown in FIG. 2A, when the winding member 40 winds up the optical fiber 11, the guide member 61 guides the optical fiber 11 so that the optical fiber 11 is wound around the winding member 40 from the point A1 which functions as the starting point to a point B1.

As shown in FIG. 2A, the point B1 is provided out of alignment with the point A1. More specifically, the point B1 is provided a desired angle out of alignment with the point A1 in the circumferential direction. The point B1 is provided, for example, 144 degrees out of alignment with the point A1. The point B1 is not provided on the same circumference as the point A1, but is provided a desired length out of alignment with the point A1 in the width direction of the circumferential surface 43 which is a direction that intersects at right angles with the circumferential direction and which is a rotation shaft direction. For example, the point B1 is provided to be shifted rightward relative to the point A1.

Thus, in step 2, the optical fiber 11 is guided by the guide member 61 to skew relative to the circumferential direction from the point A1 to the point B1, and wound around the winding member 40 while skewing.

In the above, the detection portion 73 detects via the winding member 40 that the winding member 40 has rotated a desired angle in the circumferential direction and rotated from the point A1 to the point B1. Accordingly, the movement control portion 75 controls the movement of the holding-movable portion 63 so that the guide member 61 moves from the point A1 to the point B1 in the width direction of the circumferential surface 43. As a result, the holding-movable portion 63 moves in the width direction of the circumferential surface 43 while holding the guide member 61, and the guide member 61 moves from the point A1 to the point B1 in the width direction of the circumferential surface 43. As described above, when the winding member 40 winds up the optical fiber 11, the guide member 61 guides the optical fiber 11 so that the optical fiber 11 skews relative to the circumferential direction from the point A1 to the point B1 and is wound around the winding member 40.

(Step 3 (Linear Process), Point B1→Point C1)

As shown in FIG. 2A, when the winding member 40 further winds up the optical fiber 11, the guide member 61 guides the optical fiber 11 so that the optical fiber 11 is wound around the winding member 40 from the point B1 to a point C1.

As shown in FIG. 2A, the point C1 is provided out of alignment with the point B1. More specifically, the point C1 is provided a desired angle out of alignment with the point B1 in the circumferential direction. The point C1 is provided, for example, 216 degrees out of alignment with the point B1. Thus, the point C1 indicates that the winding member 40 has made one rotation relative to the point A1 in step 1 and is located at a position with the same angle as the point A1 in step 1 in the circumferential direction of the winding member 40. The point C1 is provided on the same circumference as the point B1. Thus, the point C1 is not provided on the same circumference as the point A1, but is provided a desired length out of alignment with the point A1 in the width direction of the circumferential surface 43. For example, the point C1 is provided to be shifted rightward relative to the point A1 by the length between the point A1 and the point B1 in the width direction of the circumferential surface 43.

In step 3, the optical fiber 11 is guided by the guide member 61 so that the optical fiber 11 is linearly provided from the point B1 to the point C1 along the circumferential direction, and the optical fiber 11 is linearly wound around the winding member 40.

In the above, the detection portion 73 detects via the winding member 40 that the winding member 40 has rotated a desired angle in the circumferential direction and rotated from the point B1 to the point C1. Accordingly, the movement control portion 75 controls the stopping of the holding-movable portion 63 so that the guide member 61 does not move in the width direction of the circumferential surface 43. As a result, the holding-movable portion 63 stops without moving in the width direction of the circumferential surface 43 while holding the guide member 61, and the guide member 61 is fixed in the width direction of the circumferential surface 43. As described above, when the winding member 40 winds up the optical fiber 11, the guide member 61 guides the optical fiber 11 so that the optical fiber 11 is linearly wound around the winding member 40 along the circumferential direction from the point B1 to the point C1.

(Step 4 (Reverse Shift Process), Point C1→Point D1)

As shown in FIG. 2A, when the winding member 40 further winds up the optical fiber 11, the guide member 61 guides the optical fiber 11 so that the optical fiber 11 is wound around the winding member 40 from the point C1 to a point D1.

The point D1 is provided out of alignment with the point C1. More specifically, the point D1 is provided a desired angle out of alignment with the point C1 in the circumferential direction. The point D1 is provided, for example, 144 degrees out of alignment with the point C1 (the point A1). Thus, the point D1 indicates the location at the position with the same angle as the point B1 in the circumferential direction of the winding member 40. The point D1 is not provided on the same circumference as the point C1, but is provided a desired length out of alignment with the point C1 in the width direction of the circumferential surface 43 so that the point D1 is provided on the same circumference as the point A1. For example, the point D1 is provided to be shifted leftward relative to the point C1 so that the point D1 is provided on the same circumference as the point A1. In this case, the point D1 is provided to be shifted leftward relative to the point B1 by the length between the point A1 and the point C1 in the width direction of the circumferential surface 43.

In step 4, the optical fiber 11 is guided by the guide member 61 to skew relative to the circumferential direction from the point C1 to the point D1, and wound around the winding member 40 while skewing. In this case, the optical fiber 11 intersects with the optical fiber 11 which is provided to skew relative to the circumferential direction from the point A1 to the point B1 in step 2.

In the above, the detection portion 73 detects via the winding member 40 that the winding member 40 has rotated a desired angle in the circumferential direction and rotated from the point C1 to the point D1. Accordingly, the movement control portion 75 controls the movement of the holding-movable portion 63 so that the guide member 61 moves from the point C1 to the point D1 in the width direction of the circumferential surface 43. As a result, the holding-movable portion 63 moves in the width direction of the circumferential surface 43 while holding the guide member 61, and the guide member 61 moves from the point C1 to the point D1 in the width direction of the circumferential surface 43. As described above, when the winding member 40 winds up the optical fiber 11, the guide member 61 guides the optical fiber 11 so that the optical fiber 11 skews relative to the circumferential direction from the point C1 to the point D1 and is wound around the winding member 40.

(Step 5 (Linear Process), Point D1→Point A1)

As shown in FIG. 2A, when the winding member 40 further winds up the optical fiber 11, the guide member 61 guides the optical fiber 11 so that the optical fiber 11 is wound around the winding member 40 from the point D1 to the point A1.

As shown in FIG. 2A, the point A1 is provided out of alignment with the point D1. More specifically, the point A1 is provided a desired angle out of alignment with the point D1 in the circumferential direction. The point A1 is provided, for example, 216 degrees out of alignment with the point D1. The point A1 in step 5 indicates that the winding member 40 has made two rotations relative to the point A1 in step 1, that the winding member 40 has made one rotation relative to the point C1 in step 3, and that one cycle of the optical fiber 11 having a length which is double the circumferential length of the winding member 40 returns to the starting point in the circumferential length of the winding member 40.

In step 5, the optical fiber 11 is guided by the guide member 61 so that the optical fiber 11 is linearly provided from the point D1 to the point A1 along the circumferential direction, and the optical fiber 11 is linearly wound around the winding member 40. In this case, the optical fiber 11 is provided parallel to the optical fiber 11 which is linearly provided from the point B1 to the point C1 along the circumferential direction in step 3.

In the above, the detection portion 73 detects via the winding member 40 that the winding member 40 has rotated a desired angle in the circumferential direction and rotated from the point D1 to the point A1. Accordingly, the movement control portion 75 controls the stopping of the holding-movable portion 63 so that the guide member 61 does not move in the width direction of the circumferential surface 43. As a result, the holding-movable portion 63 stops without moving in the width direction of the circumferential surface 43 while holding the guide member 61, and the guide member 61 is fixed in the width direction of the circumferential surface 43. As described above, when the winding member 40 winds up the optical fiber 11, the guide member 61 guides the optical fiber 11 so that the optical fiber 11 is linearly wound around the winding member 40 along the circumferential direction from the point D1 to the point A1.

In steps 2, 3, 4, and 5, the winding member 40 makes two rotations. The optical fiber 11 having a length which is double the circumferential length of the winding member 40 is wound around the winding member 40 and manufactured.

That is, according to the present embodiment, the optical fiber 11 having a desired length is manufactured without depending on the circumferential length of the winding member 40.

In this case, one cycle of the optical fiber 11 having a length which is double the circumferential length of the winding member 40 corresponds to two rotations of the winding member 40.

[Manufacture of the Optical Fiber Bundle 11a Having a Length which is Double the Circumferential Length of the Winding Member 40]

The operations in steps 2, 3, 4, and 5 are then repeated. As a result, the winding member 40 winds up more than one optical fiber 11 having a length which is double the circumferential length of the winding member 40. In the winding member 40, the optical fibers 11 are bundled (stacked) in a continuous state, and the optical fiber bundle 11a is thereby formed. The optical fiber bundle 11a is then cut with a cutting member 81 in a part other than an intersect portion 80 as shown in FIG. 2B so that optical fiber bundles 11a having a double length will be formed. As shown in FIG. 2C and FIG. 2D, the optical fiber bundles 11a are removed from the winding member 40. According to the present embodiment, the optical fiber bundle 11a having a length which is double the circumferential length of the winding member 40 is thus manufactured.

Therefore, according to the present embodiment, a large volume of optical fiber bundles 11a are independently manufactured at a time. As the manufacturing apparatus 10 independently manufactures a large volume of optical fiber bundles 11a, the manufacturing apparatus 10 does not need to repeat the operation of winding a member around the winding member 40 to manufacture one optical fiber bundle 11a, removing the manufactured single optical fiber bundle 11a from the winding member 40, and then again winding the member around the winding member 40 to manufacture one optical fiber bundle 11a. Thus, according to the present embodiment, a large volume of optical fiber bundles 11a are manufactured without much time and labor and with uniform quality.

[Manufacture of the Optical Fiber 11 Having a Length which is Triple the Circumferential Length of the Winding Member 40]

Step 1, step 2, and step 3 are performed in order as described above. For convenience, the point A1 is referred to as the point A2, the point B1 is referred to as a point B2, and the point C1 is referred to as a point C2.

(Step 11 (Shift Process), Point C2→Point D2)

Figure 3A:
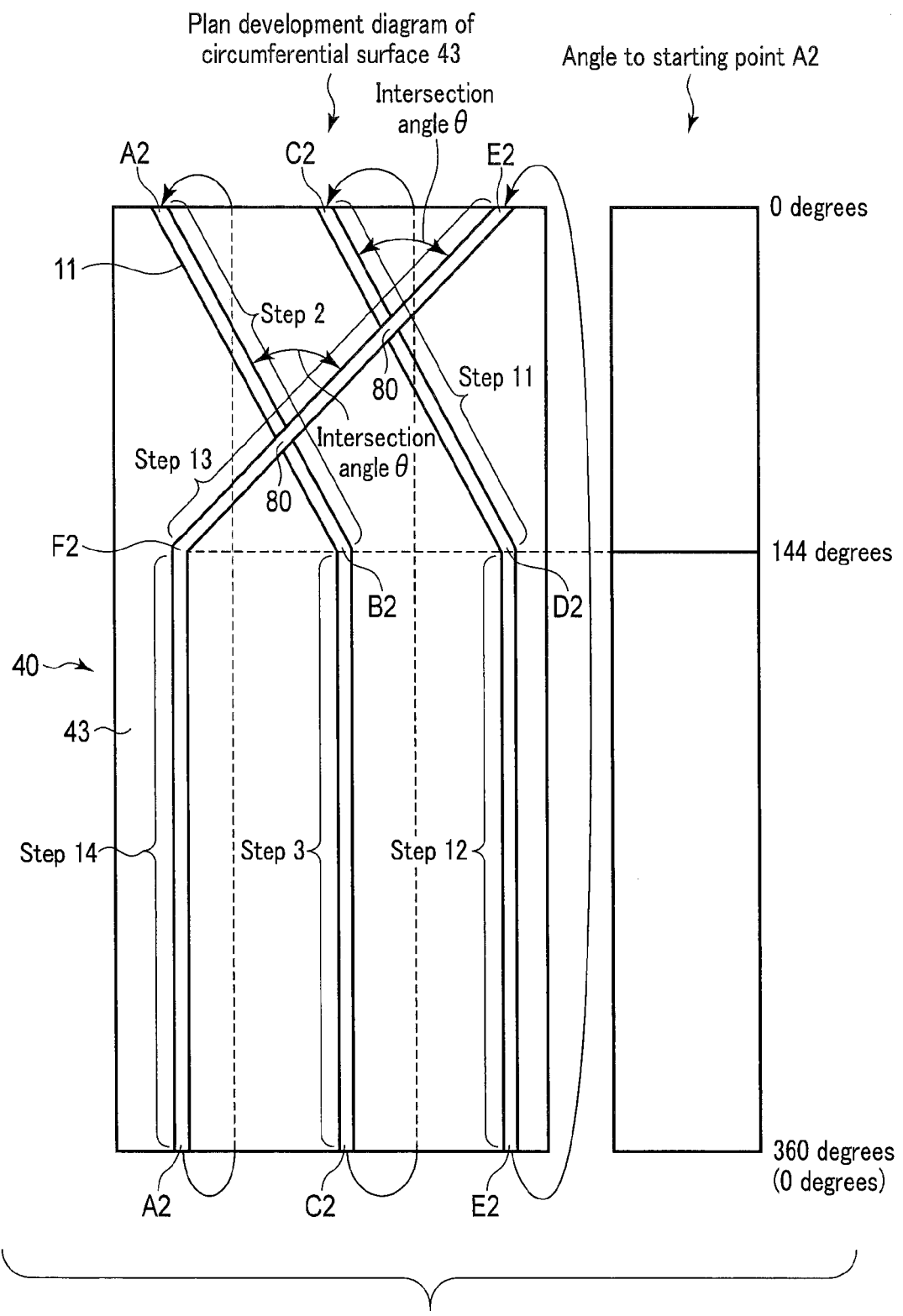
FIG. 3A is a diagram illustrating the manufacture of an optical fiber bundle having a length which is triple the circumferential length of the winding member.

As shown in FIG. 3A, when the winding member 40 further winds up the optical fiber 11, the guide member 61 guides the optical fiber 11 so that the optical fiber 11 is wound around the winding member 40 from the point C2 to a point D2.

As shown in FIG. 3A, the point D2 is provided out of alignment with the point C2. More specifically, the point D2 is provided a desired angle out of alignment with the point C2 in the circumferential direction. The point D2 is provided, for example, 144 degrees out of alignment with the point C2. Thus, the point D2 is located at a position with the same angle as the point B2 in the circumferential direction of the winding member 40. The point D2 is not provided on the same circumference as the point C2, but is provided a desired length out of alignment with the point C2 in the width direction of the circumferential surface 43 so that the point D2 is provided to be shifted rightward relative to the point C2. In this case, the point D2 is provided to be shifted rightward relative to the point B2 by the length between the point A2 and the point C2 in the width direction of the circumferential surface 43.

Thus, in step 11, the optical fiber 11 is guided by the guide member 61 to skew relative to the circumferential direction from the point C2 to the point D2, and wound around the winding member 40 while skewing. In this case, the optical fiber 11 is provided parallel to the optical fiber 11 which is provided to skew relative to the circumferential direction from the point A2 to the point B2 in step 2.

In the above, the detection portion 73 detects via the winding member 40 that the winding member 40 has rotated a desired angle in the circumferential direction and rotated from the point C2 to the point D2. Accordingly, the movement control portion 75 controls the movement of the holding-movable portion 63 so that the guide member 61 moves from the point C2 to the point D2 in the width direction of the circumferential surface 43. As a result, the holding-movable portion 63 moves in the width direction of the circumferential surface 43 while holding the guide member 61, and the guide member 61 moves from the point C2 to the point D2 in the width direction of the circumferential surface 43. As described above, when the winding member 40 winds up the optical fiber 11, the guide member 61 guides the optical fiber 11 so that the optical fiber 11 skews relative to the circumferential direction from the point C2 to the point D2 and is wound around the winding member 40.

(Step 12 (Linear Process), Point D2→Point E2)

As shown in FIG. 3A, when the winding member 40 further winds up the optical fiber 11, the guide member 61 guides the optical fiber 11 so that the optical fiber 11 is wound around the winding member 40 from the point D2 to a point E2.

As shown in FIG. 3A, the point E2 is provided out of alignment with the point D2. More specifically, the point E2 is provided a desired angle out of alignment with the point D2 in the circumferential direction. The point E2 is provided, for example, 216 degrees out of alignment with the point D2. Thus, the point E2 indicates that the winding member 40 has made two rotations relative to the point A2 in step 1, and that the winding member 40 has made one rotation relative to the point C2 in step 3, and indicates the location at the position with the same angle as the point A2 and the point C2 in the circumferential direction of the winding member 40. The point E2 is provided on the same circumference as the point D2. Thus, the point E2 is not provided on the same circumference as the point A2 and the point C2, but is provided a desired length out of alignment with the point A2 and the point C2 in the width direction of the circumferential surface 43. For example, the point E2 is provided to be shifted rightward relative to the point C2 by the length between the point A2 and the point B2 in the width direction of the circumferential surface 43. In other words, the point E2 is provided to be shifted rightward relative to the point C2 by the length between the point A2 and the point C2 in the width direction of the circumferential surface 43.

In step 12, the optical fiber 11 is guided by the guide member 61 so that the optical fiber 11 is linearly provided from the point D2 to the point E2 along the circumferential direction, and the optical fiber 11 is linearly wound around the winding member 40. In this case, the optical fiber 11 is provided parallel to the optical fiber 11 which is linearly provided from the point B2 to the point C2 along the circumferential direction in step 3.

In the above, the detection portion 73 detects via the winding member 40 that the winding member 40 has rotated a desired angle in the circumferential direction and rotated from the point D2 to the point E2. Accordingly, the movement control portion 75 controls the stopping of the holding-movable portion 63 so that the guide member 61 does not move in the width direction of the circumferential surface 43. As a result, the holding-movable portion 63 stops without moving in the width direction of the circumferential surface 43 while holding the guide member 61, and the guide member 61 is fixed in the width direction of the circumferential surface 43. As described above, when the winding member 40 winds up the optical fiber 11, the guide member 61 guides the optical fiber 11 so that the optical fiber 11 is linearly wound around the winding member 40 along the circumferential direction from the point D2 to the point E2.

(Step 13 (Reverse Shift Process), Point E2→Point F2)

As shown in FIG. 3A, when the winding member 40 further winds up the optical fiber 11, the guide member 61 guides the optical fiber 11 so that the optical fiber 11 is wound around the winding member 40 from the point E2 to a point F2.

As shown in FIG. 3A, the point F2 is provided out of alignment with the point E2. More specifically, the point F2 is provided a desired angle out of alignment with the point E2 in the circumferential direction. The point F2 is provided, for example, 144 degrees out of alignment with the point E2 (the point A2). Thus, the point F2 indicates the location at the position with the same angle as the point B2 and the point D2 in the circumferential direction of the winding member 40. The point F2 is not provided on the same circumference as the point E2, but is provided a desired length out of alignment with the point E2 in the width direction of the circumferential surface 43 so that the point F2 is provided on the same circumference as the point A2. For example, the point F2 is provided to be shifted leftward relative to the point E2 so that the point F2 is provided on the same circumference as the point A2. In this case, the point F2 is provided to be shifted leftward relative to the point B2 by the length between the point A2 and the point C2 in the width direction of the circumferential surface 43. The point F2 is also provided to be shifted leftward relative to the point D2 by the length between the point A2 and the point E2 in the width direction of the circumferential surface 43.

In step 13, the optical fiber 11 is guided by the guide member 61 to skew relative to the circumferential direction from the point E2 to the point F2, and wound around the winding member 40 while skewing. In this case, the optical fiber 11 intersects with the optical fiber 11 which is provided to skew relative to the circumferential direction from the point A2 to the point B2 in step 2, and the optical fiber 11 which is provided to skew relative to the circumferential direction from the point C2 to the point D2 in step 11.

In the above, the detection portion 73 detects via the winding member 40 that the winding member 40 has rotated a desired angle in the circumferential direction and rotated from the point E2 to the point F2. Accordingly, the movement control portion 75 controls the movement of the holding-movable portion 63 so that the guide member 61 moves from the point E2 to the point F2 in the width direction of the circumferential surface 43. As a result, the holding-movable portion 63 moves in the width direction of the circumferential surface 43 while holding the guide member 61, and the guide member 61 moves from the point E2 to the point F2 in the width direction of the circumferential surface 43. As described above, when the winding member 40 winds up the optical fiber 11, the guide member 61 guides the optical fiber 11 so that the optical fiber 11 skews relative to the circumferential direction from the point E2 to the point F2 and is wound around the winding member 40.

(Step 14 (Linear Process), Point F2→Point A2)

As shown in FIG. 3A, when the winding member 40 further winds up the optical fiber 11, the guide member 61 guides the optical fiber 11 so that the optical fiber 11 is wound around the winding member 40 from the point F2 to the point A2.

As shown in FIG. 3A, the point A2 is provided out of alignment with the point F2. More specifically, the point A2 is provided a desired angle out of alignment with the point F2 in the circumferential direction. The point A2 is provided, for example, 216 degrees out of alignment with the point F2. Thus, the point A2 in step 14 indicates that the winding member 40 has made three rotations relative to the point A2 in step 1, and that one cycle of the optical fiber 11 having a length which is triple the circumferential length of the winding member 40 returns to the starting point in the circumferential length of the winding member 40.

In step 14, the optical fiber 11 is guided by the guide member 61 so that the optical fiber 11 is linearly provided from the point F2 to the point A2 along the circumferential direction, and the optical fiber 11 is linearly wound around the winding member 40. In this case, the optical fiber 11 is provided parallel to the optical fiber 11 which is linearly provided from the point B2 to the point C2 along the circumferential direction in step 3, and the optical fiber 11 which is linearly provided from the point D2 to the point E2 along the circumferential direction in step 12.

In the above, the detection portion 73 detects via the winding member 40 that the winding member 40 has rotated a desired angle in the circumferential direction and rotated from the point F2 to the point A2. Accordingly, the movement control portion 75 controls the stopping of the holding-movable portion 63 so that the guide member 61 does not move in the width direction of the circumferential surface 43. As a result, the holding-movable portion 63 stops without moving in the width direction of the circumferential surface 43 while holding the guide member 61, and the guide member 61 is fixed in the width direction of the circumferential surface 43. As described above, when the winding member 40 winds up the optical fiber 11, the guide member 61 guides the optical fiber 11 so that the optical fiber 11 is linearly wound around the winding member 40 along the circumferential direction from the point F2 to the point A2.

In steps 2, 3, 11, 12, 13, and 14, the winding member 40 makes three rotations. The optical fiber 11 having a length which is triple the circumferential length of the winding member 40 is thus manufactured.

That is, according to the present embodiment, the optical fiber 11 having a desired length is manufactured without depending on the circumferential length of the winding member 40.

In this case, one cycle of the optical fiber 11 having a length which is triple the circumferential length of the winding member 40 corresponds to three rotations of the winding member 40.

[Manufacture of the Optical Fiber Bundle 11a Having a Length which is Triple the Circumferential Length of the Winding Member 40]

Figure 3B:
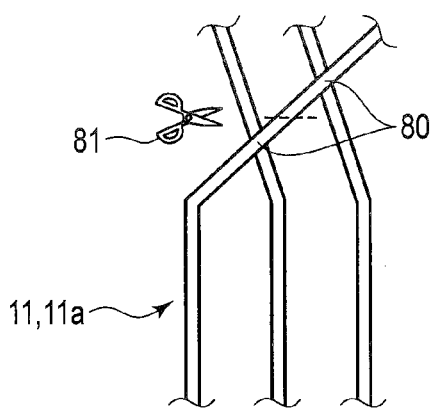
FIG. 3B is a diagram illustrating how the optical fiber bundle is cut with an unshown cutting member.
Figure 3C:
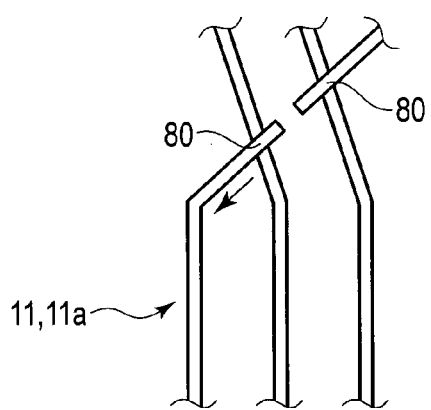
FIG. 3C is a diagram illustrating how the optical fiber bundle is removed from the winding member.
Figure 3D:
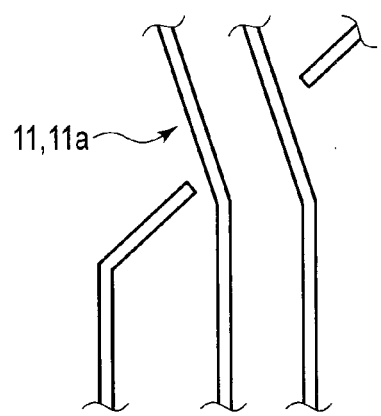
FIG. 3D is a diagram illustrating how the optical fiber bundle is removed from the winding member.

The operations in steps 2, 3, 11, 12, 13, and 14 are then repeated. As a result, the winding member 40 winds up more than one optical fiber 11 having a length which is triple the circumferential length of the winding member 40. In the winding member 40, the optical fibers 11 are bundled (stacked) in a continuous state, and the optical fiber bundle 11a is thereby formed. The optical fiber bundle 11a is then cut with the cutting member 81 in a part other than the intersect portion 80 as shown in FIG. 3B so that optical fiber bundles 11a having a triple length will be formed. As shown in FIG. 3C and FIG. 3D, the optical fiber bundles 11a are removed from the winding member 40. According to the present embodiment, the optical fiber bundle 11a having a length which is triple the circumferential length of the winding member 40 is thus formed.

Therefore, according to the present embodiment, a large volume of optical fiber bundles 11a are independently manufactured at a time. When the manufacturing apparatus 10 independently manufactures a large volume of optical fiber bundles 11a, the manufacturing apparatus 10 does not need to repeat the operation of winding a member around the winding member 40 to manufacture one optical fiber bundle 11a, removing the manufactured single optical fiber bundle 11a from the winding member 40, and then again winding the member around the winding member 40 to manufacture one optical fiber bundle 11a. Thus, according to the present embodiment, a large volume of optical fiber bundles 11a are manufactured without much time and labor and with uniform quality.

SUMMARY

As described above, when the manufacturing apparatus 10 manufactures an optical fiber bundle 11a having a length which is N times the circumferential of the winding member 40, the winding member 40 rotates N times to wind up the optical fiber 11. N is a natural number equal to or more than 2.

When the winding member 40 rotates (N−1) times with respect to a desired starting point as a standard, the optical fiber 11 is once skewed relative to the circumferential direction by the guide member 61 and further shifted by a desired length in the width direction of the circumferential surface 43 while the winding member 40 is making one rotation. In this state, the winding member 40 winds up the optical fiber 11. This operation is performed in the same direction every rotation when the winding member 40 rotates (N−1) times. This shift process is performed.

In the N-th rotation of the winding member 40, the guide member 61 performs the guide to the optical fiber 11 to skew reversely to the direction of shifting in the (N−1) rotations of the winding member 40 so that the optical fiber 11 intersects with all the optical fibers 11 which have skewed in the (N−1) rotations of the winding member 40 and the end point of the optical fiber 11 having a length which is N times returns to the starting point. In this state, the winding member 40 winds up the optical fiber 11. This reverse shift process is performed.

The linear process in step 3 may be omitted.

This operation is one cycle of the optical fiber 11 having a length which is N times the circumference of the winding member 40.

In the above, the optical fiber 11 is wound around the winding member 40 while the optical fiber 11 is being guided by the guide member 61. Owing to the constant guidance by the guide member 61, the entanglement of the optical fibers 11 is prevented.

In the above, the guide member 61 moves in the width direction of the circumferential surface 43 so that the optical fiber 11 skews. Since the guide member 61 moves, the winding member 40 does not need to be moved, and the configuration of the manufacturing apparatus 10 is simpler.

In the above, the guide member 61 guides the optical fiber 11 so that the optical fiber 11 is linearly provided along the circumferential direction except during skewing. In this state, the winding member 40 winds up the optical fiber 11. Thus, the entanglement of the optical fibers 11 is prevented.

As a result of the above, the optical fiber 11 is regularly wound around the winding member 40.

The above operation is repeated so that an optical fiber bundle 11a formed by bundling the optical fibers 11 having a length which is N times the circumference of the winding member 40 is manufactured. In the winding member 40, the optical fiber 11 is cut with the cutting member 81 so that the optical fiber bundles 11a having a length which is N times will be formed, and the optical fiber 11 is removed from the winding member 40. In this way, an optical fiber bundle 11a having a length which is N times the circumferential length of the winding member 40 is manufactured.

Advantageous Effects

According to the present embodiment, the optical fiber 11 is once skewed relative to the circumferential direction of the winding member 40 and shifted by a desired length in the width direction of the circumferential surface 43 and then wound around the winding member 40 during one rotation of the winding member 40 and every rotation of the winding member 40 when the winding member 40 rotates (N−1) times with respect to a desired starting point as a standard.

In the N-th rotation of the winding member 40, the optical fiber 11 is skewed reversely to the direction of shifting in the (N−1) rotations of the winding member 40 so that the optical fiber 11 intersects with all the optical fibers 11 which have skewed in the (N−1) rotations of the winding member 40 and the end point of the optical fiber 11 having a length which is N times returns to the starting point whereby the optical fiber 11 is wound around the winding member 40.

The above operation is one cycle of the optical fiber 11 having a length which is N times the circumference of the winding member 40. The above operation is repeated so that an optical fiber bundle 11a formed by bundling the optical fibers 11 having a length which is N times the circumference of the winding member 40 is manufactured.

Therefore, according to the present embodiment, it is possible to provide a manufacturing method of the optical fiber bundle 11a which enables the manufacture of a large volume of optical fiber bundles 11a with uniform quality at low cost, without much time and labor and without depending on the circumferential length of the winding member 40.

According to the present embodiment, it is possible to manufacture an optical fiber bundle 11a which is longer than the circumferential length of the existing winding member 40, a new winding member 40 does not need to be manufactured, and manufacturing costs for the optical fiber bundle 11a can be suppressed.

According to the present embodiment, a large volume of optical fiber bundles 11a are independently manufactured at a time. As the manufacturing apparatus 10 independently manufactures a large volume of optical fiber bundles 11a, the manufacturing apparatus 10 does not need to repeat the operation of winding a member around the winding member 40 to manufacture one optical fiber bundle 11a, removing the manufactured single optical fiber bundle 11a from the winding member 40, and then again winding the material around the winding member 40 to manufacture one optical fiber bundle 11a. Thus, according to the present embodiment, a large volume of optical fiber bundles 11a are manufactured without much time and labor and with uniform quality.

According to the present embodiment, in the above, owing to the constant guidance by the guide member 61, the entanglement of the optical fibers 11 can be prevented when the winding member 40 winds up the optical fiber 11.

According to the present embodiment, the guide member 61 moves in the width direction of the circumferential surface 43, so that the optical fiber 11 skews, and the configuration of the manufacturing apparatus 10 can be simpler.

According to the present embodiment, except during skewing, the guide member 61 guides the optical fiber 11 so that the optical fiber 11 is linearly provided along the circumferential direction. In this state, the winding member 40 winds up the optical fiber 11. Thus, according to the present embodiment, the entanglement of the optical fibers 11 can be prevented.

According to the present embodiment, the optical fiber 11 can be regularly wound around the winding member 40 as a result of the above.

According to the present embodiment, the optical fiber bundle 11a is cut in a part other than the intersect portion 80 and then removed from the winding member 40. Thus, according to the present embodiment, the optical fiber bundle 11a can be disentangled so that the optical fiber bundle 11a does not come apart, and the optical fiber bundle 11a can be easily removed.

According to the present embodiment, the guide member 61 guides so that the intersection angle θ may be, for example, 5 degrees or more and 40 degrees or less. Thus, according to the present embodiment, the optical fiber bundle 11a can be disentangled so that the optical fiber bundle 11a does not come apart, and the optical fiber bundle 11a can be easily removed. Moreover, it is possible to easily perform a bundling operation to bundle the optical fiber bundles 11a so that the removed optical fiber bundle 11a does not come apart.

Although the point B1 is provided, for example, 144 degrees out of alignment with the point A1, this angle is not specifically limited, and a desired angle can be set in consideration of, for example, the intersection angle. This also holds true with the point D1 and other points.

The present invention is not completely limited to the embodiment described above, and the components can be modified without departing the spirit of the invention at the time of carrying out the invention. Various inventions can be made by properly combining the components disclosed in the embodiment described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method of an optical fiber bundle in which a winding member rotates N times (N is a natural number equal to or more than 2) to wind up an optical fiber and thereby manufacture an optical fiber bundle having a length that is N times the circumference of the winding member, the method comprising:
    a shift process of once skewing the optical fiber relative to the circumferential direction of the winding member and shifting the optical fiber a desired length in the width direction of a circumferential surface of the winding member and then winding the optical fiber around the winding member during one rotation of the winding member and every rotation of the winding member when the winding member rotates (N−1) times with respect to a desired starting point as a standard; and
    a reverse shift process of skewing the optical fiber reversely to the direction of shifting in the (N−1) rotations of the winding member so that the optical fiber intersects with all the optical fibers which have skewed in the (N−1) rotations of the winding member and the end point of the optical fiber having a length which is N times returns to the starting point in the N-th rotation of the winding member whereby the optical fiber is wound around the winding member,
    wherein an operation in which the shift process and the reverse shift process are performed once in this order is one cycle of the optical fiber having a length which is N times the circumference of the winding member, and the operation is repeated so that an optical fiber bundle formed by bundling the optical fibers having a length which is N times the circumference of the winding member is manufactured.

2. The manufacturing method of the optical fiber bundle according to claim 1, wherein the winding member winds up the optical fiber while the optical fiber is being guided by a guide member.

3. The manufacturing method of the optical fiber bundle according to claim 2, wherein the guide member moves in the width direction of the circumferential surface so that the optical fiber skews.

4. The manufacturing method of the optical fiber bundle according to claim 3, wherein except during skewing, the guide member guides the optical fiber so that the optical fiber is linearly provided along the circumferential direction.

5. The manufacturing method of the optical fiber bundle according to claim 4, wherein the optical fiber bundle is cut in a part other than an intersect portion and then removed from the winding member.

* * * * *